(12) United States Patent
Murphy et al.

(10) Patent No.: US 7,086,616 B2
(45) Date of Patent: Aug. 8, 2006

(54) BROADCAST SPREADER ATTACHMENT FOR HAND-HELD GAS OR ELECTRIC LEAF BLOWERS

(76) Inventors: Charles Patrick Murphy, #5 Highland St., Gainesville, GA (US) 30501; Charles Daniel Treadway, 3110 Oak Dr., Lawrenceville, GA (US) 30044-4120

(*) Notice: Subject to any disclaimer, the term of this patent is extended or adjusted under 35 U.S.C. 154(b) by 0 days.

(21) Appl. No.: 10/825,461

(22) Filed: Apr. 15, 2004

(65) Prior Publication Data
US 2005/0230506 A1    Oct. 20, 2005

(51) Int. Cl.
*A01C 3/06* (2006.01)

(52) U.S. Cl. .......................... 239/654; 77/154; 77/407; 77/650

(58) Field of Classification Search ................ 239/650, 239/653, 654, 664, 77, 152, 153, 154, 652, 239/407
See application file for complete search history.

(56) References Cited

U.S. PATENT DOCUMENTS

| | | |
|---|---|---|
| 1,406,903 A | 2/1922 | Rose |
| 1,469,118 A | 9/1923 | Speicher |
| 2,610,433 A | 9/1952 | Chisholm et al. |
| 2,675,147 A | 4/1954 | Odom |
| 2,792,151 A | 5/1957 | Wagner |
| 3,586,215 A | 6/1971 | Roche |
| 3,586,238 A | 6/1971 | Schmierer et al. |
| 4,071,170 A | 1/1978 | Gunzel et al. |
| 4,089,441 A * | 5/1978 | Cole et al. .................... 222/631 |
| 4,256,241 A * | 3/1981 | Mesic ........................... 222/85 |
| 4,474,327 A * | 10/1984 | Mattson et al. .............. 239/143 |
| 4,630,929 A * | 12/1986 | Medlin ......................... 366/10 |
| 4,658,778 A | 4/1987 | Gamoh et al. |
| 5,092,526 A * | 3/1992 | Takata ......................... 239/655 |
| 5,119,993 A | 6/1992 | Gunzel, Jr. et al. |
| 5,190,225 A | 3/1993 | Williams |
| 5,226,567 A | 7/1993 | Sansalone |
| 5,392,996 A | 2/1995 | Ussery |
| 5,429,278 A | 7/1995 | Sansalone |
| 5,779,161 A | 7/1998 | Dvorak |
| 5,964,420 A * | 10/1999 | Hampton ..................... 239/654 |
| 6,409,097 B1 | 6/2002 | McCauley |
| 6,761,157 B1* | 7/2004 | Bartek .......................... 124/56 |
| 6,793,563 B1* | 9/2004 | Daniel .......................... 451/90 |

* cited by examiner

*Primary Examiner*—David A. Scherbel
*Assistant Examiner*—Seth Barney
(74) *Attorney, Agent, or Firm*—Greg O'Bradovich, Esq.; Joel D. Myers, Esq.; Myers & Kaplan, L.L.C.

(57) ABSTRACT

A broadcast spreader attachment for a powered leaf blower for dispensing large dry particulates. The attachment typically includes an elongate main tube having opposite intake and discharge ends. A secondary smaller tube is affixed to and in fluid communication with the main tube. The intake of the main tube is adapted for attachment to a leaf blower such that the discharge of the leaf blower is in fluid communication with the main tube. The secondary tube includes particulate flow control apparatus and adjustment knob in fluid communication with the secondary tube. A supply hose is attached to the top end of the secondary tube. The hose is additionally attached to a dry particulate hopper such that the hose is in fluid communication with the secondary tube and the particulate hopper.

11 Claims, 4 Drawing Sheets

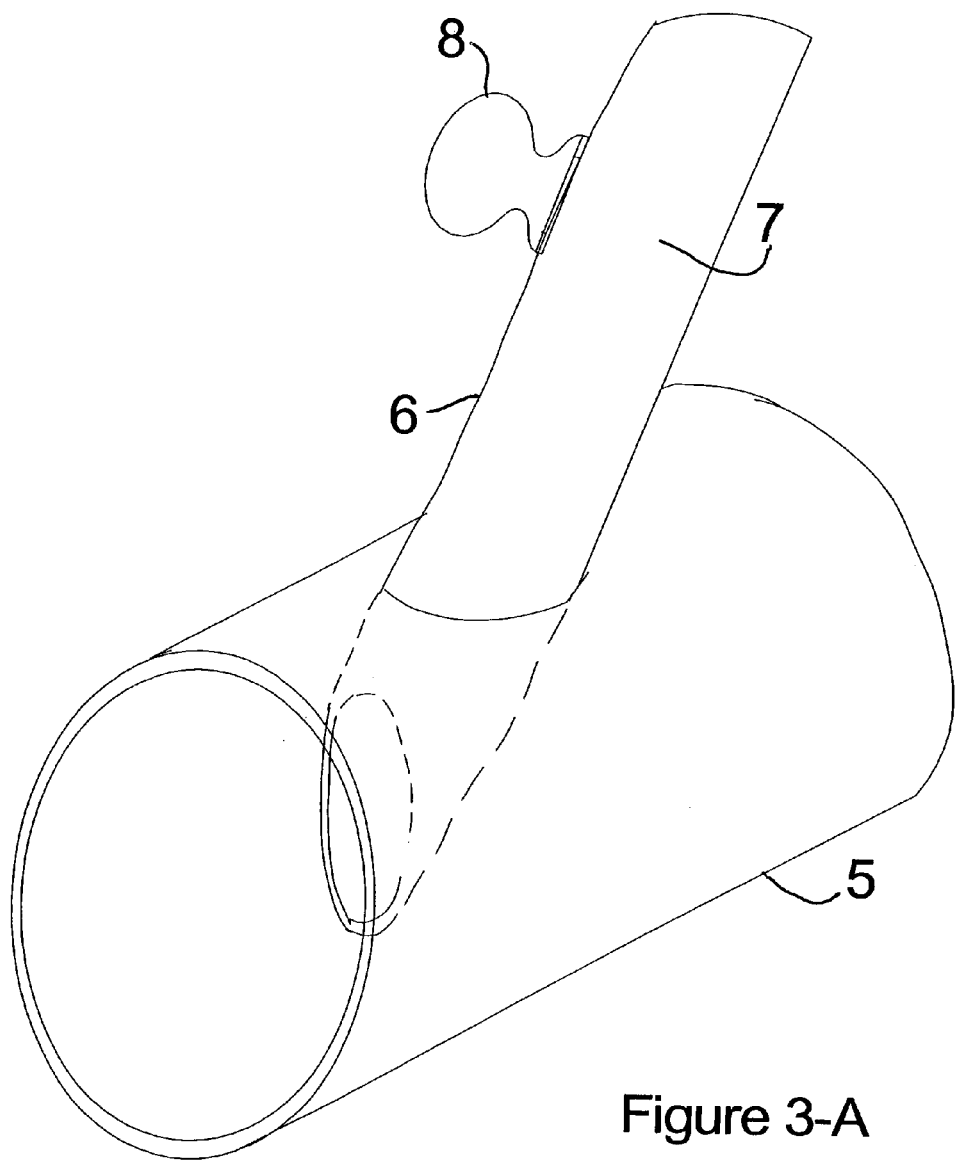
Figure 3-A

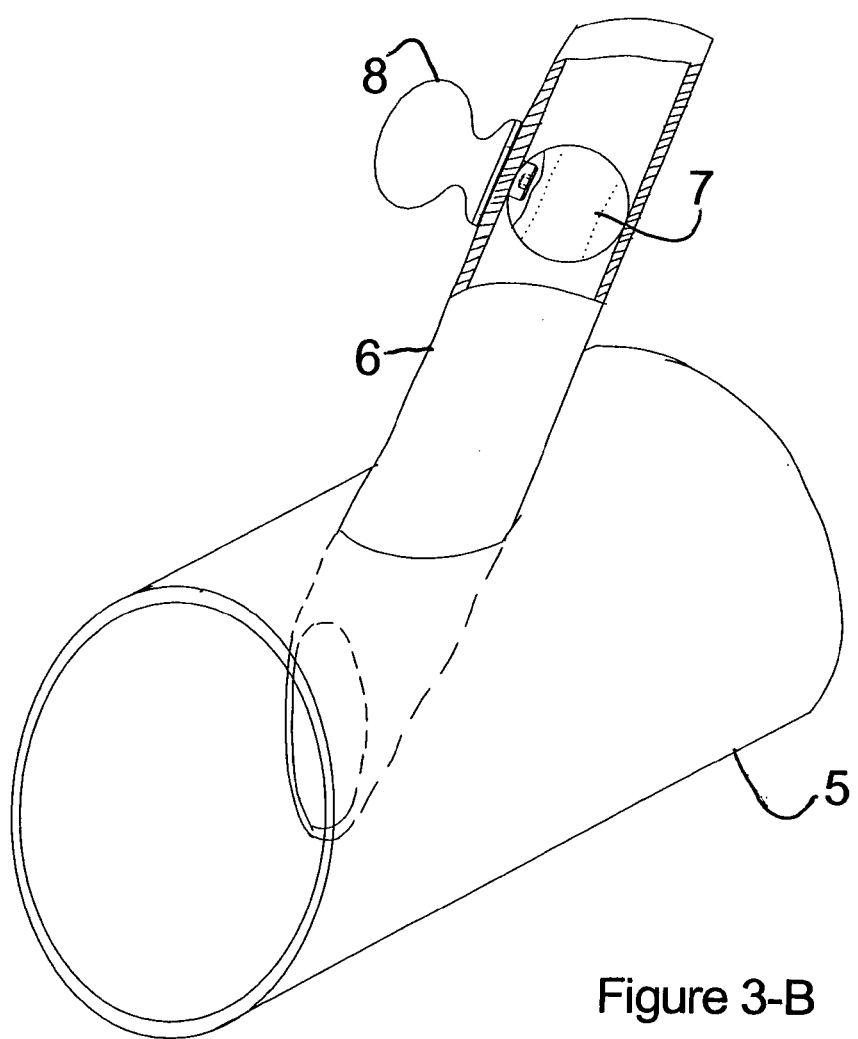
Figure 3-B

BROADCAST SPREADER ATTACHMENT FOR HAND-HELD GAS OR ELECTRIC LEAF BLOWERS

CROSS REFERENCE TO RELATED APPLICATIONS

Not applicable.

I. Field of the Invention

The present invention relates generally to the field of gardening accessories, and more particularly to a new broadcast spreader attachment for leaf blowers for the application fo grass seeds or fertilizer to an existing lawn or new applications.

II. Description of the Related Art

The prior art includes several patents related to devices for dispensing finely powdered particulates and grass seeds and fertilizers. The devices are known to consist of familiar and obvious configurations, not withstanding the plethora of designs found in the prior art, which have been developed for countless objectives.

Over many years inventors have created several types of labor-saving devices to dispense chemical nutrients, pesticides and grass seeds to a lawn or garden. U.S. Pat. No. 6,409,097 to McCauley (2002) discloses an apparatus that is designed primarily for liquid dispersal using a hand held leaf blower as a source of air flow. Although the invention does have a dry material dispersal embodiment, the hopper described to contain the dry material does not appear to contain a sufficient volume of material to disperse said material over a large area. From the description of this hopper, a user would need to refill it numerous times. This seems very impractical for the user desiring to spread significant quantities of dry large particulates such as fertilizer or grass seed or other lawn nutrients over a large area such as a yard or garden. The invention also appears to be complicated to fabricate when. there are other known devices that accomplish liquid dispersal of yard care material. U.S. Pat. No. 5,964,420 to Hampton (1998) discloses an applicator attachment for a leaf blower for applying particulates to a lawn or garden. This device might be successful in the application of finely powdered particulates such as pesticides, it is doubtful the device could dispense dry fertilizers or other large granular nutrients or seeds. It also seems to be a rather complicated and costly device to fabricate. U.S. Pat. No. 5,779,161 to Dvorak (1998) discloses an apparatus for dispensing powdered and granulated materials. This device might function as the inventor claims, but would be difficult to properly attach to a blower device and does not appear to be able to hold a large amount of material to be dispensed in the material container. U.S. Pat. No. 5,392,996 to Ussery (1994) discloses an attachment-type apparatus that would probably dispense fine particulates, however, due to the method of communication of the particulates through the intake of a leaf blower it is doubtful that this unit would be able to dispense dry fertilizer and would possibly damage seeds dispensed through this method. It also seems to be a complicated device to fabricate for such a limited use. U.S. Pat. No. 4,474,327 to Mattson et al. (1984) describes a functional spreader attachment for leaf blowers. The disclosed method of entraining particulate material within the discharge air stream of a blower appears to be susceptible to clogging and other interference. The apparatus does appear able to dispense seed with little or no damage, but as mentioned, could be subject to clogging of the supply hoses. It also appears to be a complicated apparatus to fabricate. U.S. Pat. No. 5,190,225 to Williams (1993) as described should be able to accommodate large granular nutrients and does appear to be able to contain a sufficient amount of this material for application. This device, however, with the dedicated blower motor and other controls appears to be a costly and complicated device to manufacture for such a limited use. U.S. Pat. No. 3,586,238 to Maichingen et al. (1971) is similar to the apparatus described by U.S. Pat. No. 5,190,225 but seems more suited to dispensing nutrients and fertilizers and pesticides entrained in a liquid medium. It use appears to be limited to this use and would be costly to manufacture for this singular use. U.S. Pat. No. 5,429,278 to Sansalone (1994) discloses an apparatus specifically designed for fine particulates such as pesticides, and does not appear to have the capacity to accommodate large granular nutrients or seeds. The invention seems to be easily manufactured, but the limited use of such a device would restrict demand for this type of apparatus. U.S. Pat. No. 4,658,778 to Gamoh, et al. (1987) discloses a powered backpack unit designed to reduce noise for the operator and dispense fine particulates or vacuum outdoor debris. This unit appears to have a small material container and would probably not be used to dispense such large and heavy nutrients such as fertilizer. The production cost of such a unit, with the dedicated motor, would be high for limited use. U.S. Pat. No. 4,071,170 to Gunzel, Jr., et al. (1978) discloses an apparatus for dusting plants with fine particulates such as insecticide. The unit was designed to overcome the problems with application of this type of material entrained in forced air. The device, however, is not designed for dispensing large nutrients such as granulated fertilizer or other nutrients. While the device might be able to dispense seeds, the hopper of the unit would not be able to hold a significant amount of this material. The dedicated motor required by this unit would increase the cost of production of such a device. U.S. Pat. No. 4,256,241 to Mesic (1981) discloses a device for the application of pesticide dust. This unit does not appear to be able to dispense large granular nutrients or seed due to this design. The material container is only suitable for a small amount of fine particulate material that could be distributed as a fine dust over many plants or a large grassy area to be treated for an infestation. U.S. Pat. No. 5,226,567 to Sansalone (1993) discloses an air-powered device for applying dust to garden plants. The device is limited in the capacity of the material container to powdered insecticides, and would not be able to dispense large granular nutrients due to the possibility of clogging of the delivery mechanism. The dedicated air blower for this device would entail high production cost for the limited use. U.S. Pat. No. 5,119,993 to Gunzel, Jr., et al. (1992) discloses an improved device similar to U.S. Pat. No. 4,071,170 that appears to have corrected problems in the earlier device and appears able to dispense large granular nutrients. The material container would not be able to contain large amounts of fertilizers and other such nutrients, therefore, anyone using this device for dispensing such material would need to refill the hopper several times for large applications. The dedicated blower would cause the production costs for this unit to be high and the device would have a limited use. U.S. Pat. No. 1,406,903 to Rose (1922) disclosed a hand held dry spray gun. This unit was not designed for fertilizer; it might be able to dispense seeds, but appears to be primarily designed for spraying dust with a pumping action onto plants. U.S. Pat. No. 2,610,433 to Chisholm, et al. (1952) discloses an insecticide dispenser that appears to use a compressed gas pressure to dispense powder. This unit was clearly not designed for other purposes. U.S. Pat. No. 2,675,147 to Odom (1954) discloses a Flock Gun for the dispensing of powdered insecticides and could not accommodate large granular nutrients such as fertilizer. U.S. Pat. No. 2,792,151 to Wagner (1957) discloses an air-agitated flocking gun apparatus that improved on earlier designs, but is still limited to dispensing powdered insecticides and could not be used to dispense fertilizers in large granular forms. U.S. Pat. No. 3,586,215 to Roche (1971) discloses an apparatus that uses pneumatic pressure to dispense dry powdered particulate on plant life. It is unlikely this unit would be able to dispense large granular nutrients on grass or gardens. U.S. Pat. No. 1,469,118 to Speicher (1923) discloses a seed sower that would allow a person to distribute seed over an area and does appear to be able to contain a significant amount of seed in the material container. This unit is hand operated and in today's world of powered equipment such a device would be impractical for this use.

SUMMARY

Viewing the foregoing disadvantages inherent in the known types of gardening accessories now present in the prior art. The present invention provides a new broadcast spreader attachment for a leaf blower construction. The same can be utilized for applying grass seeds or fertilizer to an existing lawn or new application.

Accordingly, besides the objects and advantages of the broadcast spreader attachment several objects and advantages of the present invention are:
  (a) To provide an apparatus that will allow the user to spread grass seed and fertilizer over a lager radius than push-type mechanical spreaders.
  (b) To provide an apparatus that will allow the user to spread grass seed and fertilizer on such terrain that is inaccessible to a push-type mechanical spreader.
  (c) To provide an attachment that is easily and inexpensively fabricated and usable with the many brands of leaf blowers available.
  (d) To provide a method of spreading large granular nutrients, specifically dry fertilizer and other chemicals for lawn care.
  (e) To allow the user to control the amount of grass seed or fertilizer dispensed with the attachment.

BRIEF DESCRIPTION OF THE DRAWINGS

FIGS. 3A–3B illustrate isometric views of an embodiment of a spreader attachment;

Figure 2:
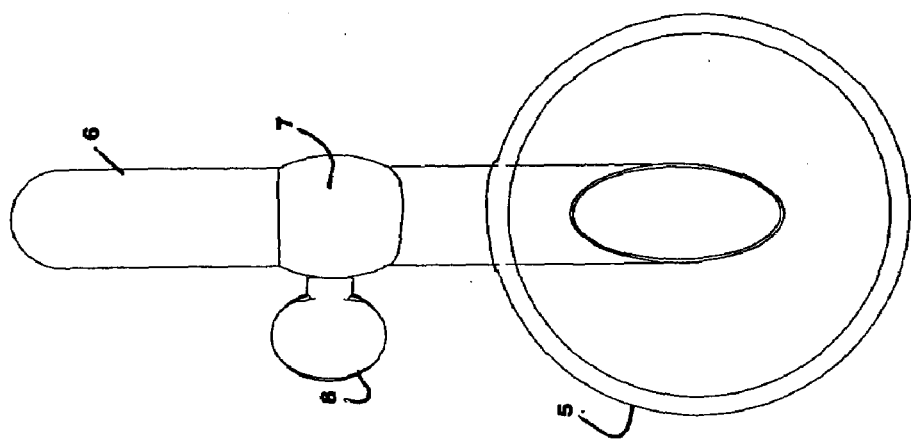
FIG. 2 an end view of an embodiment of a spreader attachment.

REFERENCE NUMERALS IN DRAWINGS 5 main tube
6 secondary (material supply) tube
7 flow control
8 flow adjustment knob
9 flexible hose
10 direction control rod
11 supply hose
12 supply hopper

DETAILED DESCRIPTION

The embodiments described herein have included dimensions in English units. It is understood that an inch is 2.54 centimeters in SI units. As such, 8 inches is 20.32 centimeters, 10 inches is 25.4 centimeters, 1½ inches is 3.81 centimeters and 2 inches is 5.08 centimeters.

Figure 1:
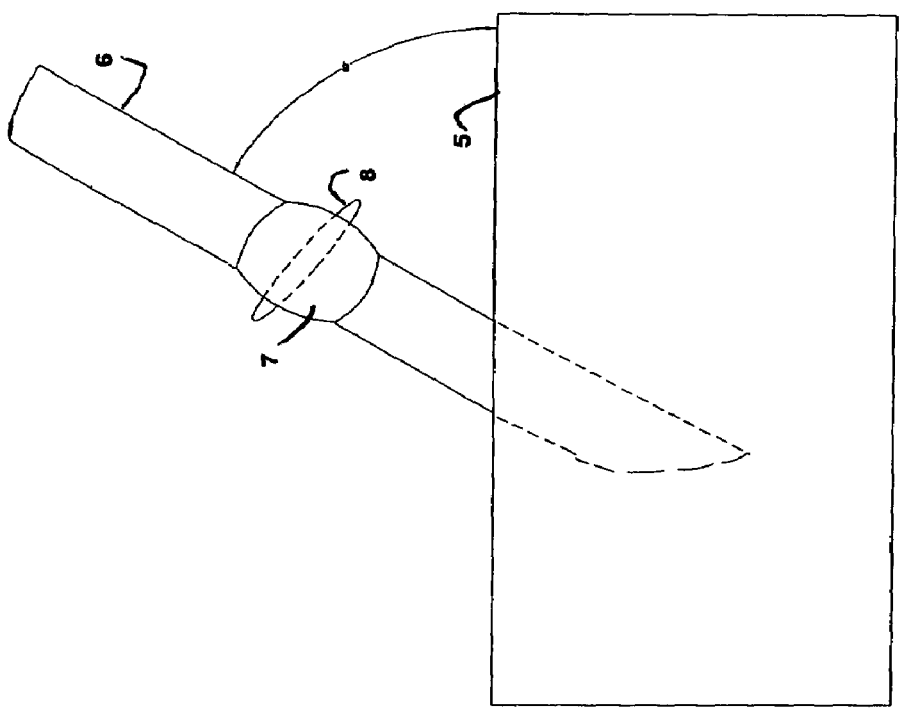
FIG. 1 illustrates a side view of an embodiment of a spreader attachment.

A preferred embodiment of the present invention is illustrated in FIG. 1(side view), FIG. 2 (end view) and FIGS. 3A–3B (isometric view). The invention consists of two tubes of differing size. The main tube, 5 and secondary tube, 6 are comprised of a lightweight durable plastic such as PVC or the equivalent. The material should be rugged enough to withstand forced air at high velocity and continual usage in the outdoors. The smaller tube is set at an approximate angle of sixty degrees to the larger tube and is in contiguous with the larger tube.

On the secondary tube 6 there is a material flow control 7, and knob 8. At the intake end of the main tube 5 there will be a system for attachment to a hand-held blower such that the invention will maintain contact during use and will then be able to be removed from the blower upon completion of use.

The material flow control 7 and knob 8 will consist of the same material or a lightweight metal. This control will allow the user to regulate the amount of particulate dispensed through the invention.

A supply line/hose 11 is attached to the secondary tube 6, which is in concert with a hopper/bag 12 for storage of the material to be dispensed while in operation.

There are no additional embodiments due to the operation of the invention.

An alternative embodiment of the invention would be the use of a powered push-type blower for the source of high velocity airflow. In this embodiment the supply hopper 12 would require a larger capacity. In addition a flexible discharge hose 9 with a directional control rod 10 would be required to direct the flow of material dispersed due to the size and the fixed direction of the outlet employed on such powered blowers.

The push type blower 20 provides an example of the means for providing a high velocity airflow as disclosed.

Figure 4:
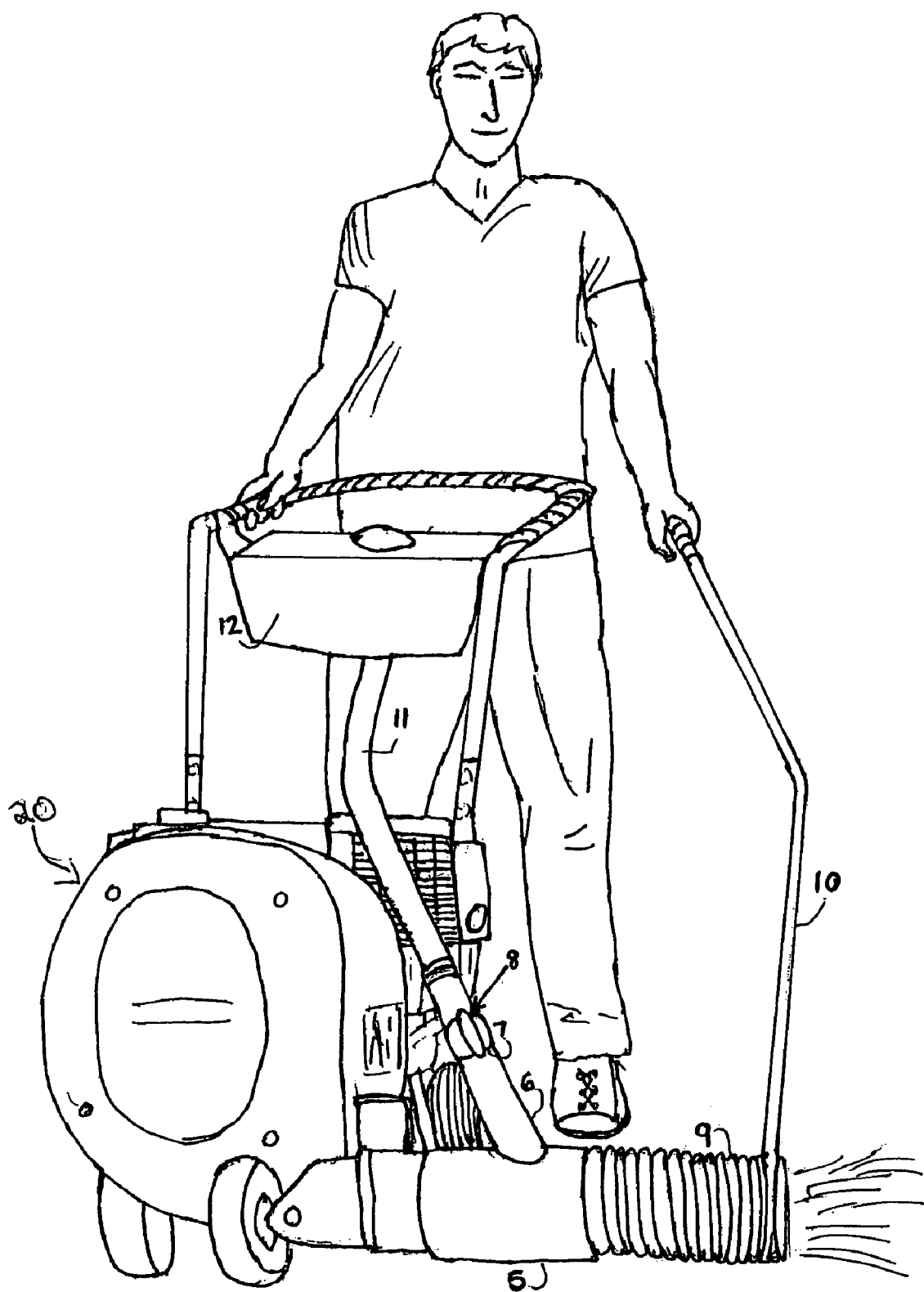
FIG. 4 illustrates an alternate embodiment of a spreader attachment for use with push-type blowers.

FIG. 4 further illustrates that the supply hopper 12 is the starting point for the feed of the material into the supply line/hose 11 and into the secondary tube 6. As is appreciated from FIG. 4, the supply line/hose 11 is downstream from the supply hopper 12 and the secondary tube 6 is downstream from the supply line/hose 11 and the hopper 12. It is further appreciated that the material from the supply hopper 12 is gravitationally fed from the supply hopper 12 into the supply line/hose 11 and into the secondary tube 6.

From the description above the advantages of our spreader attachment become evident:
  (a) The use of PVC or a similar lightweight durable material to produce the invention will allow for a low cost of production and will permit a durable end product.
  (b) The use of a flow-control device will give the end user the option of adjusting the amount of material dispersed.
  (c) The supply line for the supply tube and the material will be separate and not affect the performance of the source of high-velocity air, i.e. the hand held blower.
  (d) The device will be able to be fitted the many brands and configurations of hand held blowers available and currently in use with simple adapter fittings.

The manner of using the broadcast spreader attachment is similar to some attachments currently in use. One first removes all or a section of the main air exhaust tube of a hand-held blower. Next the invention is affixed to the tube or the blower itself.

The supply hose 11 is attached to the secondary tube 6 of the invention, and a quantity of the material to be broadcast is placed in the supply hopper 12.

The operator then starts the hand held blower, places the supply hopper over their shoulder and proceeds to the area over which they intend to disperse the material.

Next the operator points the exit end of the invention towards the desired area. After this the operator opens and adjusts the material flow control 7 using knob 8 to the desired amount of material to be broadcast and the invention disperses the material over the area. When this area is covered the operator may proceed to the next area over which the material is to be broadcast. This procedure is repeated until this material in the hopper is completely dispersed.

For the alternative embodiment the user would control the direction of the discharge of material by manipulating the control rod 10 to point the flexible discharge hose 9 in the desired direction over which the material will be spread.

At this point the operator can shut down the blower and remove the invention, or replenish the supply hopper and repeat the process until the desired results are accomplished.

We believe the action of the broadcast spreader attachment is caused by the venturi effect, we do not wish to be bound by this conclusion. The offset angle of sixty degrees from the horizontal for the smaller tube appears to allow this effect to occur with sufficient force to draw large quantities of particulates into the main tube where they are mixed with the airflow and dispersed through the discharge of the main tube out to a distance of twenty feet.

The broadcast spreader attachment provides a reliable lightweight device usable by persons of almost any age. Furthermore, the broadcast spreader attachment is a viable alternative to wheeled push-type mechanical spreaders, which can not be utilized over every terrain that may comprise a lawn or garden area.

The broadcast spreader attachment has the following additional advantages in that:

It can be manufactured to be compatible with all powered hand-held leaf blowers currently in production and in use.

It allows dry particulates to be distributed rapidly over a large area.

It allows said particulates to be dispersed with little or no damage due to bypassing any fan/impeller blades of the hand-held blower.

It allows the user to control the amount of particulates dispersed.

It allows the user to disperse particulates over terrain that would be inaccessible to a push-type mechanical spreader.

Although the above description mentions many specifics, these should not be construed as limiting the scope of the invention but as merely providing illustrations of the preferred embodiment of this invention.

Therefore the scope of the invention should be determined by the appended claims and their legal equivalents, rather than by the aforementioned examples.

We claim:

1. A device for spreading large dry particulate matter comprising:

a main elongate tube of approximately eight to ten inches in diameter and seven to ten inches in length;

a supply hopper;

a secondary tube having a one-half to two inches diameter and being affixed to the main tube at a sixty degree angle to the perpendicular of the main tube and contiguous with the main tube, a portion of the secondary tube protruding into the hollow interior of the main elongate tube, the secondary tube being connected downstream of the supply hopper; and means for controlling a gravitational feed of the volume of material dispensed from the hopper after the material is dispensed from the hopper, the means for controlling the gravitational feed of the volume of the material being located on the secondary tube and upstream of a connection point of the main tube and the secondary tube and downstream from the hopper, wherein an intake of end is for connecting to a means for providing high velocity forced airflow through a hollow interior of the main tube resulting in the broadcasting or spreading of the desired particulate matter that is received from the gravitational feed from the portion of the secondary tube protruding into the main elongate tube in the path of the high velocity airflow, and combined with the high velocity forced airflow so that particulate flowing through the secondary tube and the main tube do not engage with the means for providing high velocity forced airflow thereby resulting in little or no damage to the material broadcast over an area of ground.

2. The apparatus as claimed in claim 1 wherein the main elongate tube and the secondary tube are generally cylindrical with hollow centers.

3. The apparatus as claimed in claim 2 wherein the hollow centers of the main tube and the secondary tubes are in fluid communication.

4. The apparatus as claimed in claim 1 wherein the particulate matter flow and the high velocity forced air flow are combined adjacent the connection point of the main elongate tube and the secondary tube and within the hollow interior of the main elongate tube.

5. The apparatus as claimed in claim 4 wherein the flows are combined through fluid mechanical forces, wherein the high velocity forced airflow applies a pulling force on the particulate flow.

6. The apparatus as claimed in claim 5 wherein the fluid mechanical forces include the venturi effect.

7. The apparatus as claimed in claim 1 further comprising a flexible discharge hose connected to the discharge end of the main body and for varying the discharge direction of the mixed flows.

8. The apparatus as claimed in claim 7 further comprising a direction control rod connected to the flexible discharge hose and for providing a force on the flexible discharge hose to vary the discharge direction.

9. A broadcast spreader attachment apparatus comprising:

a main tube having a diameter, a hollow interior for supporting high velocity forced airflow and having an intake end and a discharge end;

a supply hopper;

a secondary tube being desposed upstream of the main tube and downstream of the hopper, and having a diameter less than the diameter of the main tube creating a diameter differential for varying a gravitational feed rate from the hopper between the main tube and the secondary tube;

wherein a secondary tube is connected to the main tube, and protruding into the hollow interior of the main tube so that an opening in the secondary tube is disposed in the approximate center of the hollow interior of the main tube and in the path of the high velocity airflow and being decoupled from the velocity forced airflow;

a particulate flow control connected to the secondary tube and upstream from the connection point of the main tube and secondary tube for further varying a flow differential between the main tube and secondary tube, after material is dispensed from the supply hopper, effectively changing the diameter of the secondary tube through which the particulate flows;

a control knob connected to the material flow control for varying the effective diameter;

means for providing airflow in the main tube; and means for creating a combined flow of the airflow and the particulate flow.

10. The apparatus as claimed in claim 9 wherein the means for providing a airflow in the main tube is a leaf blower.

11. The apparatus as claimed in claim 9 further comprising means for controlling the direction of broadcast of the combined airflow and particulate flow.

* * * * *